United States Patent
Chermside

(10) Patent No.: US 11,206,247 B2
(45) Date of Patent: Dec. 21, 2021

(54) SYSTEM AND METHOD FOR PROVIDING CONTROLLED APPLICATION PROGRAMMING INTERFACE SECURITY

(71) Applicant: Capital One Services, LLC, McLean, VA (US)

(72) Inventor: Michael Chermside, Ardmore, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 241 days.

(21) Appl. No.: 16/589,165

(22) Filed: Oct. 1, 2019

(65) Prior Publication Data
US 2020/0036692 A1 Jan. 30, 2020

Related U.S. Application Data

(63) Continuation of application No. 14/580,809, filed on Dec. 23, 2014, now Pat. No. 10,432,598, which is a continuation of application No. 13/611,993, filed on Sep. 12, 2012, now Pat. No. 8,955,067.

(51) Int. Cl.
*H04L 29/06* (2006.01)
*G06F 21/10* (2013.01)

(52) U.S. Cl.
CPC .......... *H04L 63/062* (2013.01); *G06F 21/10* (2013.01); *H04L 63/061* (2013.01); *H04L 63/08* (2013.01); *H04L 63/10* (2013.01)

(58) Field of Classification Search
CPC ..... H04L 63/062; H04L 63/061; H04L 63/08; H04L 63/10; G06F 21/10
See application file for complete search history.

(56) References Cited

U.S. PATENT DOCUMENTS

| 7,380,120 B1 | 5/2008 | Garcia | |
| 8,577,804 B1 * | 11/2013 | Bacastow | G06Q 20/102 705/44 |
| 8,707,276 B2 * | 4/2014 | Hill | G06Q 10/06 717/135 |

(Continued)

OTHER PUBLICATIONS

NPL Search (InnovationQ) (Year: 2021).*

(Continued)

*Primary Examiner* — Mahfuzur Rahman
*Assistant Examiner* — Richard W Cruz-Franqui
(74) *Attorney, Agent, or Firm* — Troutman Pepper Hamilton Sanders LLP; Christopher J. Forstner; John A. Morrissett

(57) ABSTRACT

A system and method for providing access to data of a user or services relevant to a user. A customer data key is created by a server that is specific to an application, the user of the application, and the device upon which the application resides. The server may receive an application programming interface call to create the customer data key; however, any call accessing or affecting user-specific data which does not contain a valid and authorized customer data key may be rejected. To authorize the access to the offered data or services, the user conducts an entirely separate transaction not mediated by the application. During this separate transaction, the customer data key may be activated, permitting access to the data or services using the activated customer data key.

20 Claims, 7 Drawing Sheets

(56) References Cited

U.S. PATENT DOCUMENTS

| | | | |
|---|---|---|---|
| 9,003,541 B1 | | 4/2015 | Patidar |
| 9,195,984 B1 | * | 11/2015 | Spector ................ G06Q 20/322 |
| 10,484,372 B1 | * | 11/2019 | Johansson ........... H04L 63/0442 |
| 2006/0037064 A1 | | 2/2006 | Jeffries et al. |
| 2006/0282662 A1 | | 12/2006 | Whitcomb |
| 2009/0006861 A1 | | 1/2009 | Bemmel |
| 2011/0066886 A1 | | 3/2011 | Sugiura |
| 2011/0283340 A1 | | 11/2011 | Ganesan |
| 2012/0078751 A1 | | 3/2012 | MacPhail et al. |
| 2012/0124651 A1 | | 5/2012 | Ganesan |
| 2012/0266229 A1 | * | 10/2012 | Simone .................. H04L 63/08 726/9 |
| 2013/0086669 A1 | | 4/2013 | Sondhi |
| 2013/0227279 A1 | | 8/2013 | Quinlan et al. |
| 2014/0289515 A1 | | 9/2014 | Sorotokin |
| 2015/0154597 A1 | * | 6/2015 | Bacastow ............ G06Q 20/356 705/72 |
| 2021/0081947 A1 | * | 3/2021 | Hockey .................. G06F 21/62 |

OTHER PUBLICATIONS

NPL Search (Google Scholar) (Year: 2019).
http://openid.net/get-an-openid/what-is-openid/ (1 pg).
http://openid.net/get-an-openid/individuals/ (1 pg).
http://tools.ietf org/html/draft-ietf-oauth-v2-21; Hardt, D., "The OAuth 2.0 Authorization Framework", Microsoft, Jul. 31, 2012 (72 pages).

* cited by examiner

SYSTEM AND METHOD FOR PROVIDING CONTROLLED APPLICATION PROGRAMMING INTERFACE SECURITY

CROSS REFERENCE TO RELATED APPLICATIONS

This application is a continuation of, and claims priority under 35 U.S.C. § 120 to, U.S. patent application Ser. No. 14/580,809, filed Dec. 23, 2014, which is a continuation of U.S. patent application Ser. No. 13/611,993, filed Sep. 12, 2012, now U.S. Pat. No. 8,955,067. The entire contents of all of the these applications are fully incorporated herein by reference.

BACKGROUND

Application Programming Interfaces (APIs) are generally employed to provide connectivity between applications and underlying data in a system or services provided by an entity or institution. Conventional authentication systems and processes for an API typically consider a single factor, trust between applications. Authentication is generally termed as the act of confirming the identity of a client or caller.

In a conventional authentication model, a client may request access to a restricted resource (protected resource) on a site (e.g., a server) by authenticating with the server via a portal or website using the resource owner's credentials. To provide third party applications (via an API) access to these restricted resources, the resource owner must share its credentials with the third party which may result in several problems. For example, in such conventional authentication models the applications and/or APIs may be required to store the resource owner's credentials (e.g., password) for future use and servers must support password authentication, despite the security weaknesses inherent in passwords. Additionally, in such conventional models applications and/or APIs may gain broad access to a resource owner's protected resources, leaving resource owners without an ability to restrict duration or access to a limited subset of resources. Thus, resource owners may not be able to revoke access to an individual third party without revoking access to all third parties, and any compromise of an API may result in the compromise of a user's password and all data protected thereby.

Additional methods or forms of authentication also exist in the industry. For example, OpenID is an open standard that describes how a user may be authenticated in a decentralized manner, eliminating the need for services to provide their own ad hoc systems and allowing users to consolidate their digital identities. More specifically, in such a method a user may interact with a relying party (via a website) that provides an option to specify an OpenID for the purposes of authentication. An identity provider, or OpenID provider (OP), is a service that specializes in registering OpenID uniform resource locators (URLs) or extensible resource identifiers (XRIs). OpenID may then enable a user to communicate with a relying party through the exchange of an identifier or OpenID corresponding to the URL or XRI chosen to name the user's identity. An OP may provide the OpenID authentication (and possibly other identity services) which is enabled by a user-agent (e.g., a program such as a browser) employed by the end-user to communicate with the relying party and OP. By way of further example, OAuth 2.0 is another open standard for authorization which allows a resource owner or user to share private resources between two sites without having to provide a user's credentials to the relying party. More specifically, OAuth 2.0 provides an authorization framework enabling a third party application or API to obtain access to a service, on behalf of a user by orchestrating an approval interaction between the user and the service or by allowing the third party application or API to obtain access on its own behalf. OAuth 2.0 typically introduces an authorization layer and separates the role of a client (i.e., online service, etc.) from that of the user or resource owner. In OAuth 2.0, a client generally requests access to resources controlled by the user and hosted by a resource server and is issued a different set of credentials than those of the user. Instead of employing the user's credentials to access protected resources, a client may obtain an access token (i.e., a string denoting a specific scope, lifetime, or other access attribute). Access tokens are issued to clients by an authorization server with the approval of the user whereby the client uses the access token to access the protected resources hosted by the resource server. For example, a user or resource owner may grant a banking service (i.e., client) access to the user's account or other information stored at resource server without sharing the user's username and password with the banking service. Rather, the user may authenticate directly with a server trusted by the banking service (i.e., an authorization server) which issues an appropriate access token.

These forms of authentication, however, are still susceptible to certain attacks on supporting systems including phishing attacks, malicious applications, and the like. Thus, there remains a need to overcome conventional limitations and provide an API to securely support both internally and externally created applications which provide access to, for example, a user's financial data or services provided by an entity or institution.

SUMMARY

The present disclosure is directed generally to systems and methods for providing an authentication methodology independent of user authentication to a front end application. As some of these applications are built by third parties there may be limited trust, however, there must be security around user data that these front end applications may not be capable of enforcing. One exemplary methodology may secure API calls to allow a user (or API provider) to control access to data or services in a form which may be run on multiple platforms such as a website plugin, mobile phone, etc. Such a methodology may be resistant to hacking even if some of the resident platforms are hostile (e.g., a rooted phone). The party controlling the API may thus be able to disable a rouge application with a single control or disable a single customer across one or all applications should an account be compromised. Furthermore, such an exemplary methodology may allow for optimal security controls over multiple applications and users, and the methodology may be implemented in a manner that is resistant to fraudulent attempts to capture a user's credentials (e.g. phishing).

One embodiment of the present invention provides a method for allowing an application acting on behalf of a user access to data pertinent to that user. The method may include issuing a unique key specific to the application, to the user of the application, and to the device or server upon which the application resides. The user may then be required to conduct a separate transaction to authorize access to the data whereby, in this separate transaction, the unique key may be activated which grants access to the data to callers using the activated key.

Another embodiment of the present invention provides a method for allowing an application acting on behalf of a user access to a service provided by an entity specific to that user (e.g. a service to move money in a bank account belonging to the user). The method may include the steps of a server issuing a unique key specific to the application, to the user of the application, and to the device or server upon which the application resides. The user may then be required to conduct a separate transaction to authorize access to the provided service whereby, in this separate transaction, the unique key may be activated which grants access to the service to callers using the activated key.

An additional embodiment of the present disclosure provides a system for controlling access by an application acting on behalf of a user to data belonging to that user or to services specific to that user and offered by an institution. The system may include one or more servers each server having a computer readable storage medium, the computer readable storage medium having instructions stored thereon. These instructions may cause the one or more servers to issue a unique key specific to the application, to the user of the application, and to the device upon which the application resides. The instructions may also cause the one or more servers to activate the unique key and which authorizes access to the data or service to callers using the activated key. The instructions to create the unique key and the instructions to activate the key are performed in separate transactions with the server.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

DETAILED DESCRIPTION

To facilitate an understanding of the present subject matter, the various embodiments of a system and method for providing secure, controlled access to an application programming interface security are provided with reference to the figures where like elements have been given like numerical designations.

Embodiments of the present subject matter may be utilized to provide security and/or access to data of a user stored with a data custodian or to services provided by an entity, custodian or institution. An exemplary custodian may be, for example, a financial institution such as a bank, brokerage firm or other similar entity. Of course, a custodian may also be any agent or any agent's computer or computers acting as an intermediary between two other parties or computers of two other parties where access, such as via the Internet, to certain information or data is designed to be limited, regardless of whether or not the information or data is confidential. A custodian may also include a secure operating system executing on a microprocessor-based computer terminal or device capable of interactive network communications, or wireless device that connects to, and communicates through, the Internet using, for example, a wireless access protocol (WAP) or other protocol, and utilizing operating-system controls to limit access to data.

Figure 1:
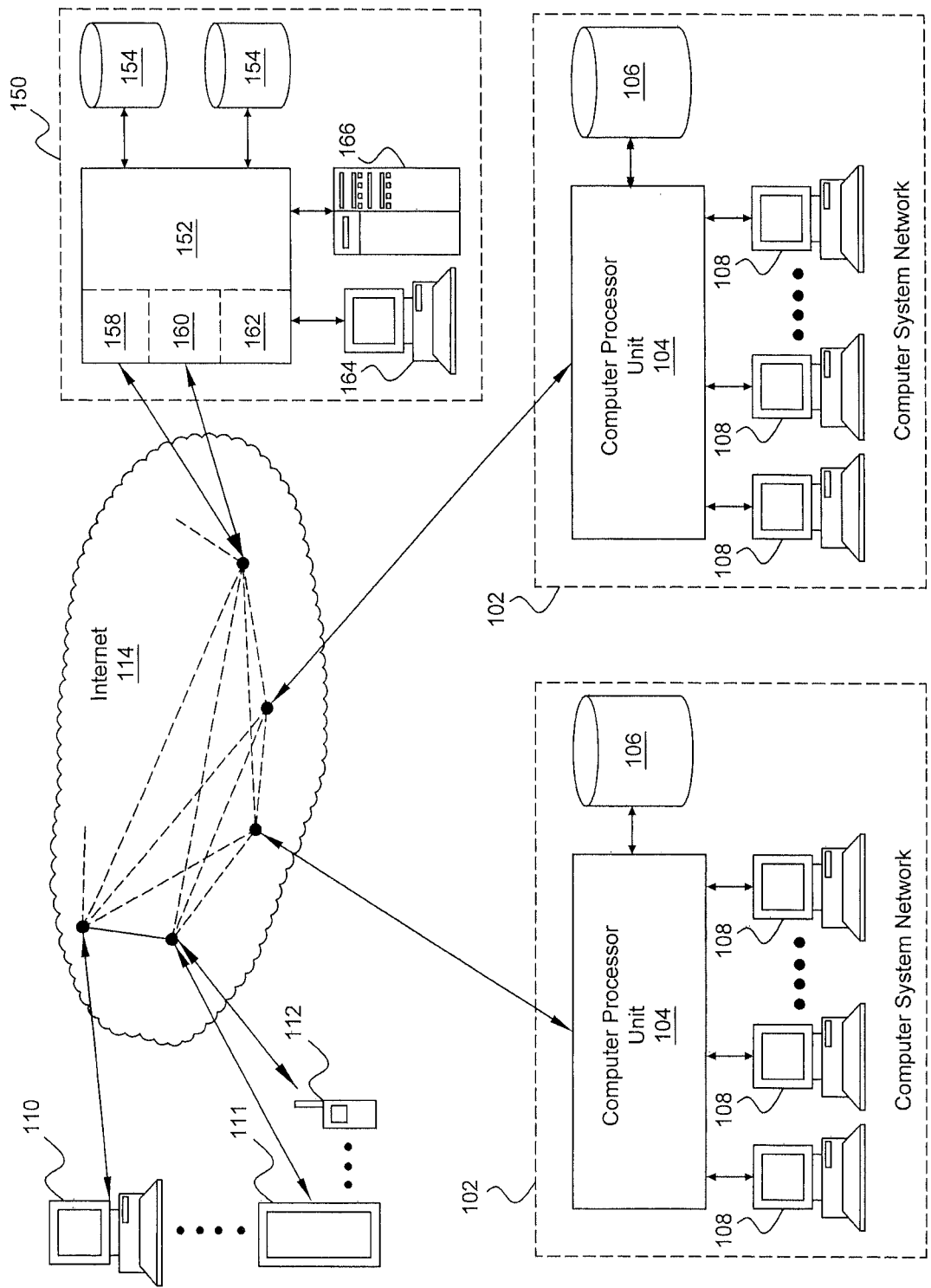
FIG. 1 is an illustration of an exemplary data access system connected to a plurality of interconnected computer system networks and devices.

FIG. 1 is an illustration of an exemplary data access system 150 connected to a plurality of interconnected computer system networks 102 and devices 110, 111, 112. The data access system 150 may be employed by a custodian described above or any agent or intermediary thereof, for example. Each computer system network 102 may include a corresponding local computer processor unit 104, which is coupled to a corresponding local data storage unit 106 and to local network terminals 108. A computer system network 102 may be a local area network (LAN) or part of a wide area network (WAN), for example. An exemplary data access system 150 and local computer processor units 104 may be selectively coupled to a plurality of devices 110 through the Internet 114 or another known means. Exemplary devices may be desktop computers 110, tablets 111, mobile devices 112 such as cell phones, smart phones, and the like. Each of the devices 110, 111, 112 and local terminals 108 may have various devices connected to their local computer systems, such as scanners, barcode readers, printers, finger print scanners, mouse devices, keyboards, and other interface devices. The data access system 150 may be protected from network attacks by a piece of software or specialized hardware, commonly known as a firewall. It is understood that a firewall may be used to block network connections from the outside world to the data access system 150 inside the firewall. It is also understood that firewalls are often governed by a set of rules that specify what IP addresses, ports, and even types of traffic are allowed to connect to machines inside the firewall. It is also understood that other network security defense tools may be employed as part of a defense-in-depth strategy to secure the data access system 150 including, but not limited to, intranet subnet partitioning, intrusion detection or host-based intrusion prevention systems. Communications between any or all of the devices to an exemplary data access system 150 may be via a transport layer security (TLS) tunnel or secure sockets layer (SSL) tunnel to prevent snooping and/or alternation of such communications and respective information. These tunnels are exemplary only as other cryptographic protocols may be employed to provide communications security over the Internet and encrypt segments of network connects at the application layer.

An exemplary data access system 150 may include a processing unit 152 coupled to one or more data storage units 154, 156. The processing unit 152 may provide front-end graphical user interfaces (GUI), e.g., customer GUI 158 and a data access service provider GUI 160, as well as back-end GUIs 162 to a terminal 108, device 110, 111, 112 or to a local computer 164. The GUIs may take the form of, for example, a webpage that is displayed using a browser program local to the terminal 108, device 110, 111, 112 or to the local computer 164. It is understood that the data access system 150 may be implemented on one or more computers 164, servers 166, or like devices. For example, a data access system may include servers programmed or partitioned based on permitted access to the data of a custodian or customer. It should be noted that the terms "customer" and "user" are used interchangeably herein and such use should not limit the scope of the claims appended herewith. Front- and back-end GUIs 158, 160, 162 may be portal pages that include various content retrieved from the one or more data storage devices 154, 156. As used herein, "portal" may be general-purpose Internet portals and/or may include GUIs that are of interest to specific, limited audiences and that provide a user access to a plurality of different kinds of related or unrelated information, links and tools as described below. It should also be noted that the terms "webpage" and "website" may be used interchangeably herein and such use should not limit the scope of the claims appended herewith.

A user or customer may gain access to source data access system 150 by using a device 108, 110, 111, 112, 164, programmed with a Web browser or other software, to locate and select (such as by clicking with a mouse) a particular webpage. Application Programming Interfaces (APIs) may be employed to provide connectivity between applications resident on the devices 108, 110, 111, 112, 164 and underlying data in the system 150 or services provided by an entity, custodian or institution. The content of the webpage may be located on the one or more data storage devices 154, 156. The device 108, 110, 111, 112, 164 may be a microprocessor-based computer terminal, a pager adaptable to communicate through the Internet, Kiosks with Internet access, personal digital assistants (PDAs) (e.g., a PALM device manufactured by Palm, Inc., IPAQ device available from Compaq, iPHONE from Apple or BLACKBERRY from RIM), cellular phone, tablet, or other devices capable of interactive network communications, such as an electronic personal planner. Of course, such devices 109, 110, 111, 112, 164 may be wireless or wire-line that connect to and communicate through the Internet.

As mentioned above, an exemplary data access system 150 may provide separate features and functionality for users thereof, including customers and data access service providers, as well as back-end users that manage the data access system 150. A customer or user may be an individual or business or organization that signs up for or otherwise takes advantage of a data custodian service, and a "data access service provider" may be an individual or business or organization, such as a financial or banking institution, that provides one or more data access services to customers and/or third parties.

Embodiments of the present subject matter may provide security around an API for a wide variety of services to obtain information from an entity or custodian such as a financial or banking institution and/or may perform operations within the entity or custodian. This API may be available for code running anywhere outside the entity, including code written by independent users, or the API may be restricted only to code that has been reviewed and approved. An exemplary API may grant a user control over what applications may access their respective data stored on a central or custodial server, may run a respective application on a potentially untrustworthy platform without any increased risk to data of any other user, and may be resistant to aggressive third party attacks. The API may provide a method to build an application capable of running anywhere with network access that is capable of accessing data from an exemplary system. For example, an exemplary API may be utilized to build a smartphone application to track a user's progress toward a savings goal or may be utilized to build an application for transferring funds from one user to another. Exemplary services may employ, for example, a representational state transfer (REST)-based call with JavaScript Object Notation (JSON) data; such a service may be used from practically any language or development environment. Of course, other protocols and/or data-interchange formats may be employed in embodiments of the present subject matter such as a Simple Object Access Protocol (SOAP)-based call, eXtensible Markup Language (XML) format, or other protocols and/or formats; thus, such an example should not limit the scope of the claims appended herewith. Generally, such applications should be reviewed and approved by the respective institution prior to deployment to ensure that users or customers thereof remain in control of their respective data.

In one non-limiting embodiment, a call or request to an exemplary system may be made using HTTP. As is known, HTTP defines several "verbs" including, GET, POST, PUT, HEAD, TRACE, OPTIONS, CONNECT, and DELETE, to name a few. An institution's service may use any one or several of these verbs and may define a pattern of URLs to correspond to certain institutional entities such as an "account" or "transaction". For example, performing a GET on a given URL may be used to read information about the entity, and performing a POST on a given URL may be used to create a new entity. Performing a PUT may be used for modifying fields, and performing a DELETE may be used for removing an entity. Thus, a user may perform a GET on an account to ascertain the balance in that account or perform a PUT for a certain transaction to modify the amount of the transaction. Of course, this functionality may recreate any number of processes including some that might otherwise be performed using Open Financial Exchange (OFX) (which is a specification for electronic exchange of financial data between financial institutions, businesses and users via the Internet).

In one embodiment, an exemplary API call may return a single JSON object (which may have inner objects) or a list of JSON objects. The documentation for a specific API call may determine the type of returned object returned by the respective field (e.g., an account has an "accountNumber" field, a "balance" field, an "availableBalance" field, etc.). Any number of fields may be specified, depending upon the service provided. Furthermore, a default set of fields may be provided. Generally, security policies resident on a browser may prevent an HTML application from one domain from using data returned by a call to a different domain (known as the "same origin policy"), thereby preventing browser-based applications from using a specific API. A response using JSONP (JSON with padding) may be employed in this case to request data from a server in a different domain whereby the calling application supplies the name of a function in the global namespace. The respective API call, instead of returning the data, may return JavaScript to call this function and pass the appropriate data. Thus to support JSONP, exemplary API calls may specify a query parameter "callback" setting it to the name of the function. The returned JSON may then be wrapped with "<functionname>("and");", for example.

Exemplary APIs may include a variety of levels of security. For example, initial security may be implemented through the use of a TLS or SSL tunnel in communications with an exemplary system 150. Thus, calls made to the system from a remote device may use https rather than http and any call not so encrypted may be rejected. A first layer of security may include an application key or "ApplicationKey". An application key is generally a unique key issued for each application from a respective API provider. In such an embodiment, any API call may be rejected if it lacks this application key. Further, monitoring, rate limiting, access to sensitive API calls, and an overall ability to disable the application may be controlled on the server-side of an exemplary system using such an application key. As an additional option, the issuing institution may review code before issuing an application key to enforce reasonable standards. In another embodiment, an existing API security package may be utilized to provide features such as rate limiting, denial-of-service resistance, and transaction logging and reporting. Thus, a per-application (rather than a per-customer or per-installation) key may also be utilized for this layer.

Independent of an application key or in addition to the key as a second layer of security, an embodiment may issue a customer data key or "CustDataKey". Generally, this exemplary layer of security is directed to securing customer data; thus, in some embodiments not all institutional services or data may require this security layer. For example, services accessing a financial institution's current rates or services that set up a customer data key may not require this level of security. It follows, however, that services that read and/or modify customer-confidential or customer-sensitive data must provide a customer data key. In one embodiment, the customer data key may be provided in an HTTP header. It should be noted, however, that the customer data key is specific to a single customer or user, to a particular APIusing application, and to a particular installation thereof and is not issued until that customer begins using a specific application. That is, a new, unique CustDataKey is issued the first time that a given user utilizes a given installation of a specific application, and the key is specific to that user, that application, and that installation. Thus, it follows that a new CustDataKey is issued in the instances when a user installs and launches an application on a device, when another user (e.g., spouse, friend, etc.) accesses his own account on the same device, and in instances when a user installs and launches a second application on the same device, and in instances when a user installs the same application to a second device, etc. If any one of these three variables change, then a new CustDataKey will need to be issued (and authorized). In one embodiment, the CustDataKey may be stored in a storage medium on the device. This storage medium may be a default medium or otherwise.

The customer data key is not valid for accessing a customer's data or performing operations related to that customer until the respective user successfully accesses an institution's services (e.g., logs onto a financial institution's website) using the independent authorization procedures such as, but not limited to, a two factor identification procedure. In one embodiment, when a customer accesses the institution's website, if any keys have been issued for his or her respective data an alert may be provided to the user which describes the application and access requested. The customer may then approve the request, deny it, or do neither. Of course, the customer or the institution may revoke previously approved keys. Thus, all calls that access sensitive or confidential customer data must provide a CustDataKey, and in the event that the CustDataKey is invalid, the respective call will be provided with an error and denied.

To obtain a new customer data key the respective application should, through a respective API call, request a customer to enter their "username" or other identifying means and a POST will be performed with an appropriate string of data, e.g., JSON data. A message may then be returned that contains the customer data key for the respective application for access or modification, etc. of the customer's data. At this stage, the customer data key is not authorized, that is, the application has requested access to customer data but access has yet to be granted. In one embodiment, an exemplary application may display a message to the user of a device instructing the user to log onto their respective account at the institution and approve the request from the application. This approval must be provided before access to customer data will be granted, thus ensuring the customer maintains control of his or her data. In one embodiment, the application may make a call to a specific URL to determine whether the customer data key has been approved. A return value of "revoked", in this case may indicate that the customer or institution has prohibited the application (or at least that installation of the application) from access to that customer's data. A return value of "pending" may indicate that the customer has not yet approved or rejected the access request. A return value of "approved" may indicate that the application has been granted the requested access. The application may use this to begin a new transaction (in the case of "revoked"), continue prompting the customer to approve the request (in the case of "pending"), or proceed with invoking API calls and performing application functionality (in the case of an "approved").

An optional third layer of security may exist within the specific application. The implementation details of such security may be dependent upon the application and the services accessed thereby. For example, if the application's function is obtaining info/illation regarding the current financial balance of a customer, then the application may not require specific access controls. In contrast, an application whose function was managing or modifying account balances (creating money transfers and the like) may include additional measures of security such as a login processes or multi-factor authentication. Exemplary and non-limiting security for this third layer may include requiring users to enter a PIN, to enter an alternative password, to confirm answers to predetermined and/or specific questions, etc. Of course, the respective institution may enforce standards on this layer of security by reviewing code of applications prior to allowing that application's keys to be presented for approval by customers. It should be noted that the protection of the API provided by the CustDataKey of the second layer may be combined with any sort of additional security within the end application (this third layer). For example, a banking application that displays a customer's current checking-account balance on a display device may require no additional security. Thus, once the application has been authorized to use the API, the application may, for example, call a GET_BALANCE service every 15 minutes to obtain (and/or display) the latest balance. In this instance, the application would not need or have any credentials for the customer and would not need to store the customer's username after the initial call to obtain the CustomerKey.

In another example of in-application security, a banking application may request a customer's username and then show a unique-to-the-customer image prior to accepting the password, PIN or other authentication to prevent phishing. In a further example, a banking application may utilize a single CustDataKey and use different levels of security for different actions, e.g., showing a balance with no login, requiring a quick connect-the-dots pattern to unlock basic functionality but only allowing transfers to accounts not owned by the customer after a more stringent password challenge. In an additional example, a banking application may allow a customer to specify the level of security desired, recognizing that some customers are more concerned with convenience and others more concerned with security (of course, access may still be controlled with a CustDataKey regardless of the security level chosen).

As another example, a financial institution offering an API may institute a review policy requiring all applications using the API to be reviewed to ensure that the application's security was sufficient to satisfy regulations. In this case, if an application did not meet such standards, no CustDataKeys would be issued for the application and/or existing keys may be revoked. In a further example, a lost-phone service may automatically make API calls to disable CustDataKeys issued to a customer's lost phone (in addition to normal functions of remote locking of the phone and retrieving GPS location) thus being an equivalent to the cancellation of one's lost or stolen credit cards.

It is thus an aspect of embodiments of the present subject matter to provide a benefit that even if an individual planted a virus (i.e., hacked) onto a device capable of key-logging to capture a customer's PIN, that individual would not be able to use the device to access the APIs from another phone as the individual would not have a correct CustDataKey.

Figure 2:
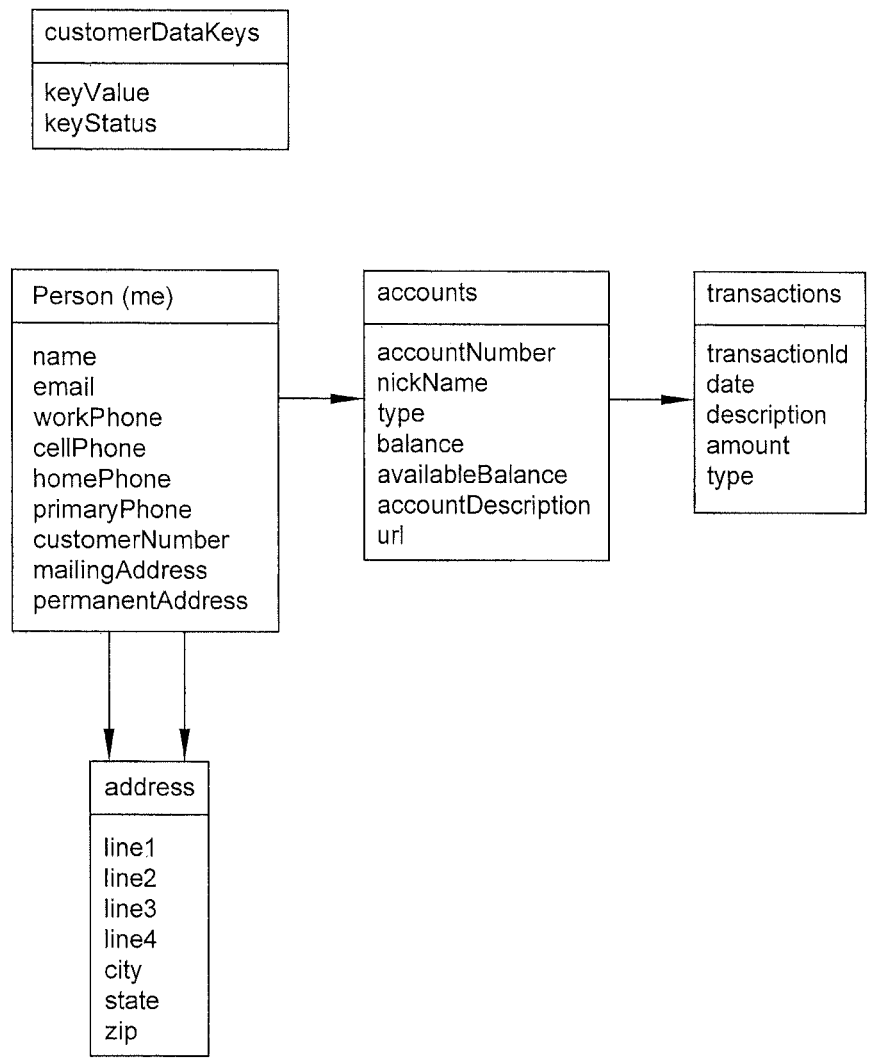
FIG. 2 is a data entity diagram of field relationships in an embodiment of the present subject matter.

In a system which, by way of example, incorporated all three of the layers described above, calls or requests may include a variety of service-specific calls. For example, a ping service may use a GET call (e.g., "/v1/ping") to test a connectivity to the API by calling a service that returned a fixed string (e.g., {"value":"pong"}). Such a call might require a valid issued application key (layer 1), but not a valid CustDataKey (layer 2) as there is no customer-specific data being accessed. Another service requiring only an application key may be one to create a new CustDataKey. Such a service may use a POST call (e.g., "/v1/customerDataKeys") to obtain a (not yet authorized) CustDataKey which is required for any of the service calls that access, modify, etc. customer data or access customer-specific services offered by an institution. In one non-limiting embodiment, the CustomerDataKey structure may include basic information about a particular customer data key and may include fields such as keyValue and keyStatus as shown in FIG. 2. A keyStatus field may include the statuses of "pending", "approved", or "revoked".

Another service may use a GET call (e.g., "v1/customerDataKeys/{customer-data-key}") to check the status of a customer data key. As discussed above, exemplary customer data keys may have a "pending", "approved", or "revoked" status. Thus, if a "pending" status is returned for this GET call, this indicates that the customer data key has been issued but the customer still needs to approve the key before use. If an "approved" status is returned this indicates that the customer data key is valid for use. If a "revoked" status is returned this indicates that the customer or institution has revoked permissions for a key. Such a service may also return an appropriate CustomerDataKey structure.

Another non-limiting service may get customer data. Such a service, as it accesses customer-specific data, would require an active CustDataKey to be provided. An exemplary service may use a GET call (e.g., "/v1/me") to obtain customer personal data specific to the CustDataKey passed on the call. This may include a variety of fields such as, but not limited to, name, email, contact information, phone numbers (work, cell, home, etc.), addresses, and so forth, contained in a person structure as shown in FIG. 2. In one embodiment, the address fields may include sub-structures having additional fields such as, but not limited to line1, line2, line3, line4 (each a line of the address), city, state, and zip as illustrated in FIG. 2. Of course, these fields, structures and sub-structures are exemplary only and should not limit the scope of the claims appended herewith.

Another exemplary service may get an account list. Again, as this information is specific to a customer the service would require an activated CustDataKey. Such a service may use a GET call (e.g., "/v1/accounts") to obtain a list of accounts owned by the customer whose customer data key is passed on the call. The service may return a JSON array of account structures, where an account structure may include fields such as, but not limited to, accountNumber (a string containing the account number for the account), nickName (a string containing the nickname that the customer has assigned to the account, if any), type (account type), balance (official ledger balance of the account), availableBalance (official available balance on the account), accountDescription (a string containing a description of the account type), and url (the URL for accessing specific details about the respective account) as shown in FIG. 2. Again, these fields and structures are exemplary only and should not limit the scope of the claims appended herewith.

An exemplary get account details service may use a GET call (e.g., "/v1/accounts/{accountNo}") to obtain details about a particular account specified in the URL and owned by the customer whose customer data key is passed on the call. This example illustrates that in some cases it may be desirable to verify that requested data (the account number in this case) is appropriate to the customer whose CustDataKey is being used, e.g., if an account number is passed which was not owned by the customer to whom the CustDataKey was issued, the service may issue an error instead of valid data. The service may return an account object which may include exemplary fields such as account number, nickname, account balance, available balance and the like as depicted in FIG. 2 and described previously.

An exemplary get transactions service may use a GET call (e.g., "/v1/accounts/{accountNo}/transactions") to obtain a list of recent transactions for a particular account, specified by account number in the URL and owned by the customer whose customer data key is passed on the call. This service may return a JSON list of transaction structures which may, for example, include a transaction structure with fields such as, but not limited to, transaction Id (a unique string to identify transactions), date (date on which the transaction occurred), description (text that describes the transaction, e.g., "Electronic Payment to Capital One", "Debit Card Purchase-AMAZON MKTPLACE PMTS AMZN COM BIL WA", etc.), amount (amount of the transaction in dollars), type (a string describing the type of transaction, e.g., "ATM", or "Bill Payment", etc.) as shown in FIG. 2. Furthermore, these get transactions services may utilize query parameters or other ways to allow the caller to control what transactions are returned. For example, a count parameter may be used to control the number of transactions to return, a startAfter parameter may specify which page of results should be returned, and a direction parameter may be used to specify whether earlier transactions or later transactions are returned. Of course, these query parameters are exemplary only and should not limit the scope of the claims appended herewith as any number or combination of parameters may be used to control what information or data is returned for a customer for any of the services described herein.

Figure 3:
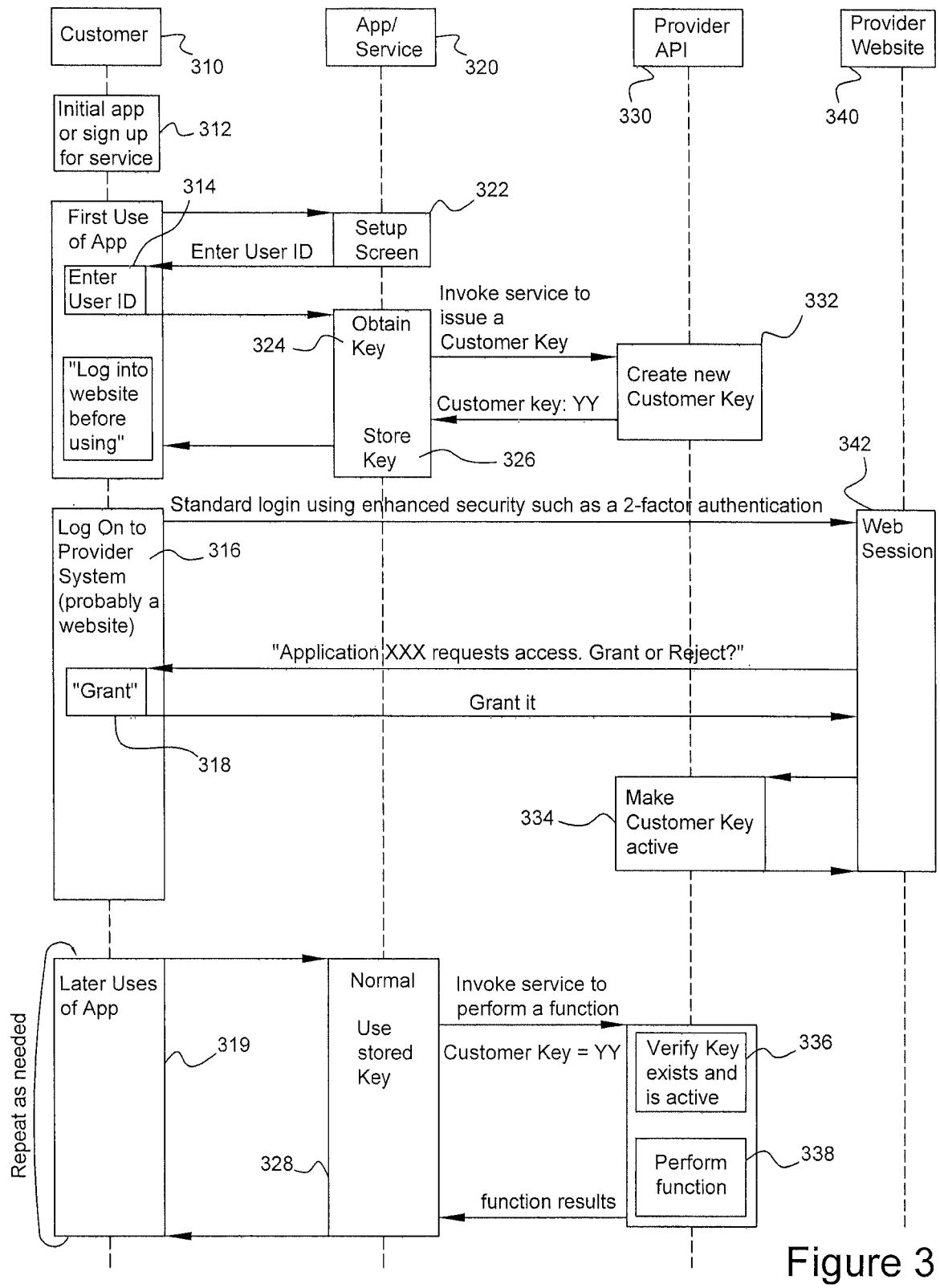
FIG. 3 is a flow diagram specifying in general terms of one embodiment of the present subject matter.

FIG. 3 is a flow diagram describing, in general terms, one embodiment of the present subject matter. With reference to FIG. 3, a method is provided for controlled application access to a system. A customer 310 may install at step 312 an application on a device depicted in FIG. 1 or sign up via a website for a specific service offered by an institution. Upon first use of the application by the customer 310, the application or service 320 may provide a setup screen 322 which prompts the customer to enter his or her user identification or "UserID" at step 314. Upon entry of the UserID from the customer 310, the application or service 320 may invoke a service offered by an institution at step 324 to issue a customer key. The provider 330 of the API, generally the respective institution, may then create a new customer key at step 332 and send the same to the application or service 320 using a processor, server or the like. The application or service 320 would store the customer key at step 326 in a storage medium resident on the device, on the servers providing the service, in a customer-specific data file, or otherwise. In one embodiment, the application or service 320 may provide a prompt to the customer 310 to log into an appropriate website 340 to activate the customer key. The customer 310 must now perform an out-of-band authentication, that is, must log onto the provider's system (likely a website 340) in a separate and distinct transaction, at step 316, and perform the standard login procedure which may include additional security measures such as multi-factor authentication, tokens, customer identifications, and the like (e.g., know-your-customer (KYC) queries). A web session 342 may then be initiated whereby the institution informs the customer 310 that a specific application is requesting access and what services, data, and records may be accessed. The web session then queries the customer 310 whether such access should be granted or rejected. In the event the customer 310 grants access, at step 318, the institution may activate the customer key by communicating with the provider 330 of the API and setting the status thereof to "active" at step 334. At this point the web session 342 has been completed and the customer 310 may subsequently utilize the application or service.

Subsequently, the customer 310 may use the application or service at step 319. The application or service 320 uses the customer key stored on the device at step 328 and invokes a specific service to perform a respective function. The provider of the API 330 will verify that the customer key exists and is active at step 336 and will perform the requested function at step 338 if it does exist and is active, performing the requested action or providing the results of the requested function to the application for display or otherwise to the customer 310.

Figure 4:
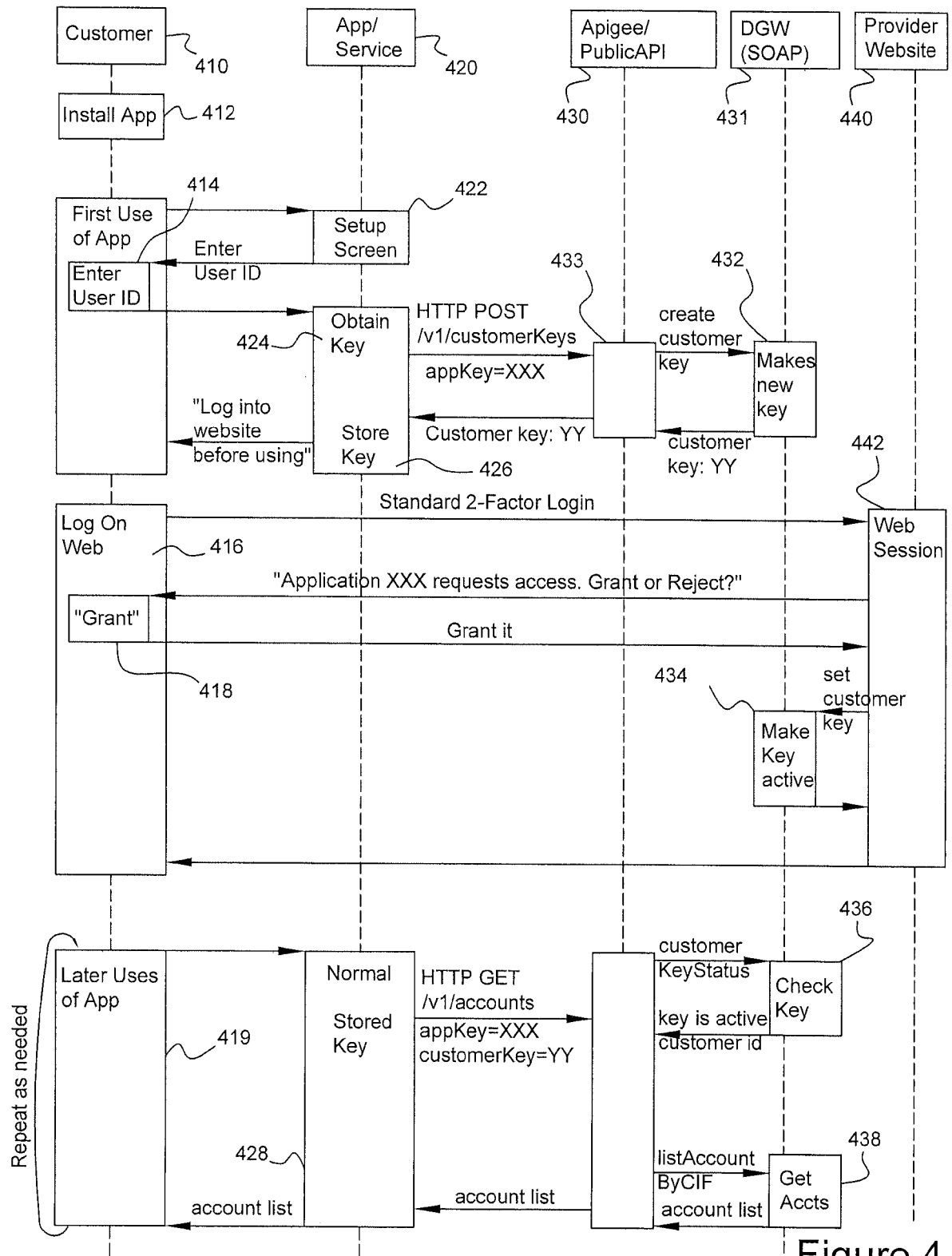
FIG. 4 is a flow diagram of another embodiment of the present subject matter.

FIG. 4 is a flow diagram of another embodiment of the present subject matter. With reference to FIG. 4, a method is provided for controlled application access to a system. A customer 410 may install at step 412 an application on a device depicted in FIG. 1. Upon first use of the application by the customer 410, the application 420, may provide a setup screen 422 which prompts the customer to enter his or her user identification or "UserID" at step 414. Upon entry of the UserID from the customer 410, the application 420 may, in this embodiment, send a POST call to "/v1/customerKeys" at step 424, to an API Management Platform comprised, in this example, of Apigee (a commercially available API management tool) and PublicAPI (a custom-built API platform component) 430. The API Management Platform 430 may then invoke a service offered by an institution at step 433 to issue a customer key by invoking a service—in this example calling a SOAP service provided by a DGW middleware server. In one embodiment, the API Management Platform 430 and middle-ware server 431 may be the same system or on separate systems and may be resident on a processor, server, etc. of the respective institution or hosted elsewhere. The provider of the API, may then create a new CustomerKey at step 432 and send the same to the application 420. The application 420 may store the customer key at step 426 in a storage medium resident on the device or otherwise. In this embodiment, the application or service 420 may provide a prompt to the customer 410 to log into an appropriate website 440 to activate the customer key. The customer 410 must now go out-of-band, that is, must log onto the website 440 in a separate and distinct transaction, at step 416, and perform a standard login procedure using additional security measures such as multi-factor authentication, phishing-resistant customer identifications, and similar techniques (e.g., "out-of-wallet" questions). A web session 442 may then be initiated during which the institution informs the customer 410 that a specific application is requesting access, identifies what services or data the application will be permitted to access if activated, and queries the customer 410 whether such access should be approved or rejected. In the event the customer 410 grants access, at step 418, the institution may activate the customer key by communicating with the server 431 and setting the status of that particular customer key to "active" at step 434. Upon setting such status, the website 440 may provide an appropriate indication of the status to the customer 410. At this point the web session 442 has been completed and the customer 410 may subsequently utilize the application to perform actions that require the APIs.

The customer 410 may then subsequently use the application at step 419 whereby the application 420 uses the customer key stored on the device at step 428 and sends, for example, a GET call ("/v1/accounts") to the API Management Platform 430. The API Management Platform 430 may request a customer key status from the middleware server 431 which then verifies whether the customer key exists and is active at step 436. If the customer key does not exist or is not active, then the Platform 430 may return an error to the application 420; if the customer key does exist and is active then the platform 430 may then request the specific function (getting accounts in this example) from appropriate services in step 438. Any results may then be provided to the application 420 for display to the customer 410 or otherwise. As noted above, the API Management Platform 430 and middle-ware server 431 may be the same and thus several described intermediate steps above may be simplified. Additionally, several separate calls may be required to fulfill a particular request so an actual implementation may be more complex than described here.

Figure 5:
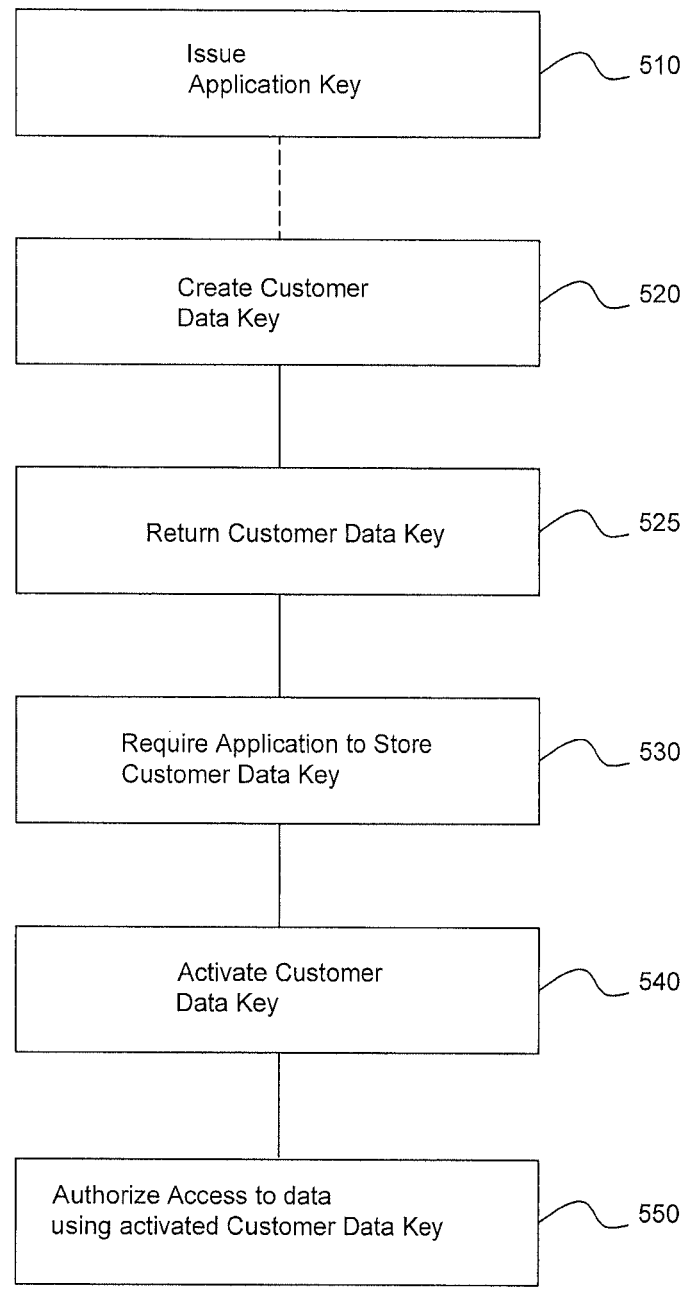
FIG. 5 is a simplified block diagram of one embodiment of the present subject matter.

FIG. 5 is a simplified block diagram of one embodiment of the present subject matter. With reference to FIG. 5, a method 500 is provided for accessing data of a user. At step 510, the method may include issuing an application key specific to an application resident on a device and then creating a customer data key at step 520 by a server, the customer data key specific to the application, to a single user of the application, and to the particular installation of the application. The term device may include devices described above in reference to FIG. 1 but may also include servers and the like. Of course, other embodiments of the present subject matter may not include step 510 as noted by the dashed line connecting steps 510 and 520, and the claims appended herewith should not be so limited. Exemplary information may be data of a user or services provided by an entity. For example, data may be, but is not limited to, financial data, confidential data, account data, personal data, sensitive data, and combinations thereof. Further, an exemplary device may be, but is not limited to, a microprocessor-based computer terminal, a mobile device, a pager, a kiosk, a personal digital assistant, a cellular phone, a tablet, an electronic personal planner, and a smart phone. Services may be, but are not limited to, transferring data, transferring funds, getting account information, displaying account information, modifying account balances and other account information, displaying personal information, modifying personal information, obtaining a financial analysis, payment of debt, depositing funds, opening accounts, and combinations thereof. In one embodiment, the method 500 may further include monitoring or limiting access to the data as a function of the number of API calls made using the issued application key ("rate limiting"). In the event that a predetermined number of API calls have been made for the application, subsequent calls from that application would not be executed. In another embodiment, either the end user or the owner of the application may be charged an appropriate fee for each API call made, and the customer data key may be used to track this and produce appropriate billing records.

At step 525, the customer data key may be returned to the application via an API call. At step 530, the user may be required to conduct a separate transaction to access the data. In this separate transaction, the customer data key may be activated at step 540 and at step 550, access to the data using the activated customer data key may be authorized. In one embodiment, step 540 may be performed by a website server and/or may include associating the customer data key with a status indicator such as, but not limited to, pending, active, or revoked. In another embodiment step 540 may include authenticating the user and verifying that the customer data key is valid with respect to the application, the user of the application, and the device upon which the application resides. Such an authentication may require the user to enter a personal identification number, to enter a password, to confirm answers to one or more predetermined questions, and combinations thereof.

Figure 6:
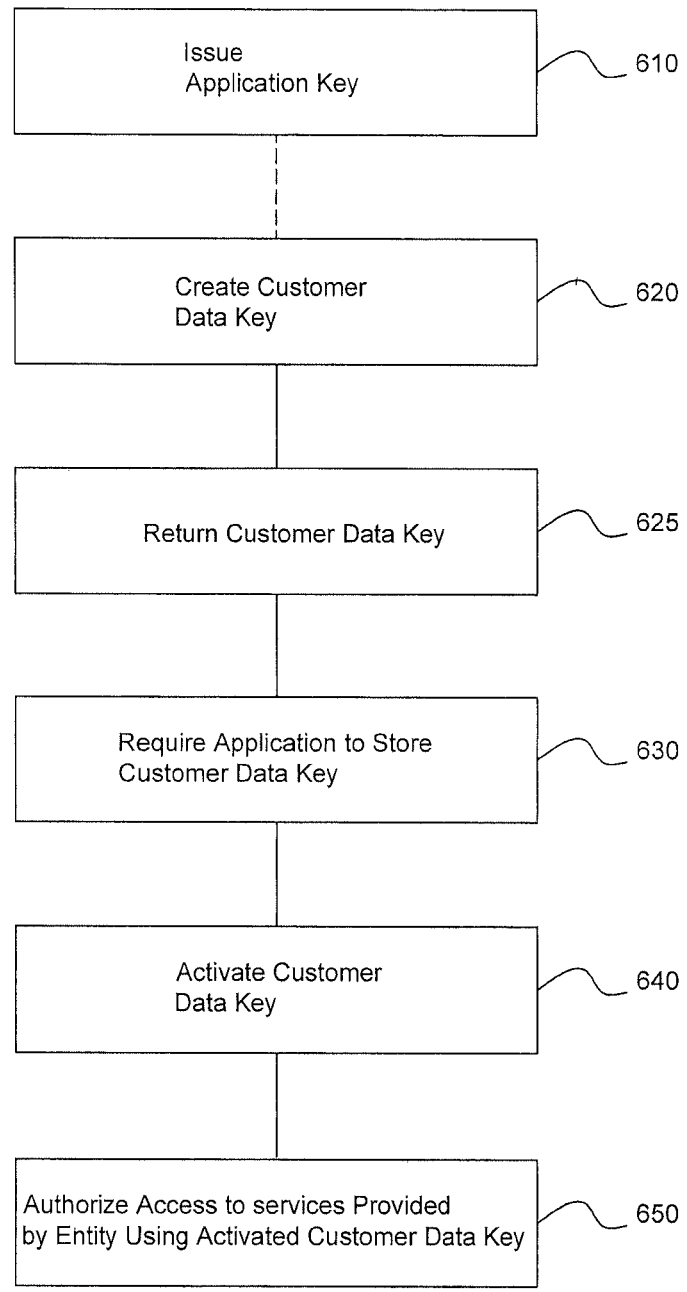
FIG. 6 is a simplified block diagram of another embodiment of the present subject matter.

FIG. 6 is a simplified block diagram of another embodiment of the present subject matter. With reference to FIG. 6, a method 600 is provided for allowing a user access to a service provided by an entity. An exemplary entity may be, but is not limited to, a financial institution and the like. At step 610, the method may include issuing an application key specific to an application resident on a device and then creating a customer data key at step 620 by a server, the customer data key being specific to the application, to the user of the application, and to the specific installation of the application. The term device may include devices described above in reference to FIG. 1 but may also include servers and the like. Of course, other embodiments of the present subject matter may not include step 610 as noted by the dashed line connecting steps 610 and 620, and the claims appended herewith should not be so limited. Exemplary information may include data of a user or services which include, but are not limited to, transferring data, transferring funds, getting account information, displaying account information, modifying account balances, displaying personal information, modifying personal information, obtaining a financial analysis, payment of debt, depositing funds, opening account, and combinations thereof. Further, an exemplary device may be, but is not limited to, a microprocessor-based computer terminal, a mobile device, a pager, a kiosk, a personal digital assistant, a cellular phone, a tablet, an electronic personal planner, and a smart phone. In one embodiment, the method 600 may further include monitoring or limiting access to the service as a function of the number of API calls made using the issued application key ("rate limiting"). In the event that a predetermined number of API calls have been made for the application, subsequent calls from that application would not be executed. In another embodiment, either the end user or the owner of the application may be charged an appropriate fee for each API call made, and the customer data key may be used to track this and produce appropriate billing records.

At step 625, the customer data key may be returned to the application via an API call. At step 630, the user may be required to conduct a separate transaction to access the service offered by the institution. In this separate transaction, the customer data key may be activated at step 640 and at step 650, access to the service using the activated customer data key may be authorized. In one embodiment, step 640 may be performed by a website server and/or may include associating the customer data key with a status indicator such as, but not limited to, pending, active, or revoked. In another embodiment step 640 may include authenticating the user and verifying that the customer data key is valid with respect to the application, the user of the application, and the device upon which the application resides. Such an authentication may require the user to enter a personal identification number, to enter a password, to confine answers to one or more predetermined questions, and combinations thereof.

While portions of this disclosure have been described with reference to a financial institution, this should not limit the scope of the claims appended herewith, as the present subject matter may find utility in many different instances where it is necessary to secure an API protecting individual customer data independently of other customers and/or where it is desirable to leverage the enhanced security of a separate, pre-existing authentication mechanism for initial setup. For example, a mobile device application may employ a banking API whereby an initial setup would occur when the application was installed and run for the first time on the device. The customer would then log onto his or her bank's website to activate the customer key (using the enhanced security of the bank's login). Thereafter, the application may use the API normally. Another example would be a web application offering financial analysis which employs a brokerage API whereby an initial setup would occur when the user first specified to the web application that he or she wanted to analyze funds invested through that brokerage. The customer may then contact the broker to activate the customer key (using some form of enhanced security). Thereafter, the web application may poll the APIs nightly and perform its respective analysis. A further example may be a data backup program which employs a secure data storage API offered by a data storage company (a service where the customer controlled the data) whereby an initial setup would occur when the data backup program was installed. The customer may then log onto the data storage company's website to activate the customer key (using the enhanced security of that site's login). Thereafter, data backups may occur on demand or via schedule.

Figure 7:
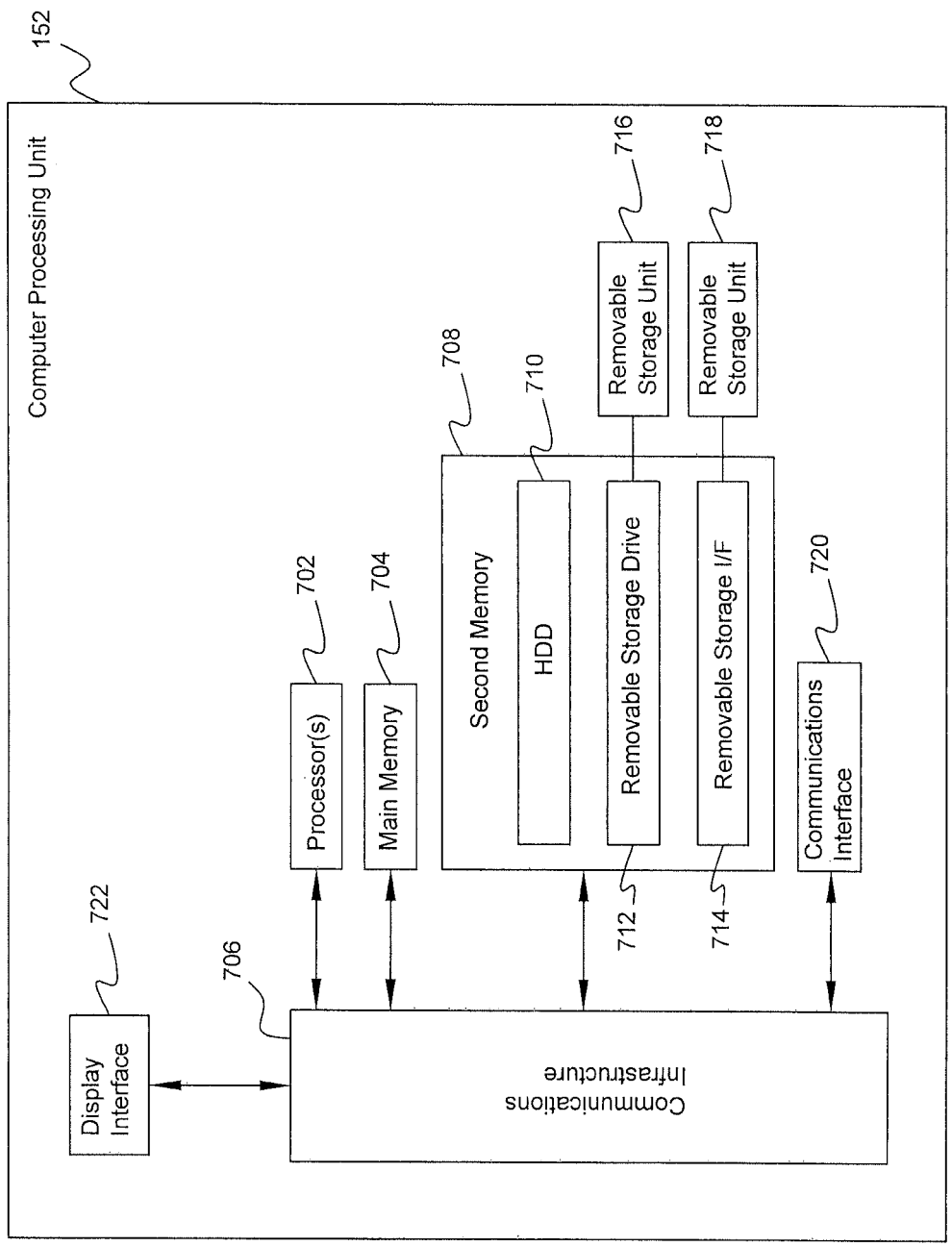
FIG. 7 is an illustration of an architecture of a computer processing unit.

FIG. 7 illustrates an example of an architecture of a computer processing unit 152 configured to implement the algorithms and software programming associated with the present disclosure. This unit may be a standalone unit, may be a server or portion thereof. As illustrated in FIG. 7, the computer processor unit 152 may include one or more processors 702. The processor 702 may be connected to a communication infrastructure 706 (e.g., a communications bus, cross-over bar, or network). As discussed above, the computer processing unit 152 may include a display interface that forwards graphics, text, and other data from the communication infrastructure (or from a frame buffer not shown) for display on the front- and back-end GUIs 158, 160, 162 and as retrieved from the one or more data storage devices 154, 156.

The computer processing unit 152 may also include a main memory 704, such as a random access memory (RAM), and a secondary memory 708. The secondary memory 708 may include, for example, a hard disk drive (HDD) 710 and/or removable storage drive 712, which may represent a floppy disk drive, a magnetic tape drive, an optical disk drive, or the like. The removable storage drive 712 may read from and/or write to a removable storage unit 716. The removable storage unit 716 may be a floppy disk, magnetic tape, optical disk, or the like. As will be understood, the removable storage unit 716 may include a computer readable storage medium having stored therein computer software and/or data.

In alternative embodiments, the secondary memory 708 may include other similar devices for allowing computer programs or other instructions to be loaded into the computer processing unit 152. The secondary memory 708 may include a removable storage unit 718 and a corresponding interface 714. Examples of such removable storage units include, but are not limited to, USB or flash drives, which allow software and data to be transferred from the removable storage unit 718 to the computer processing unit 152.

The computer processing unit 152 may also include a communications interface 720 allowing software and data to be transferred between computer processing unit 152 and external devices. Examples of a communications interface 720 may include a modem, Ethernet card, wireless network card, a Personal Computer Memory Card International Association (PCMCIA) slot and card, or the like. Software and data transferred via the communications interface 720 may be in the form of signals, which may be electronic, electromagnetic, optical, or the like that are capable of being received by the communications interface 720. These signals may be provided to the communications interface 720 via a communications path (e.g., channel), which may be implemented using wire, cable, fiber optics, a telephone line, a cellular link, a radio frequency (RF) link and other communication channels.

The terms "computer program medium" and "computer readable storage medium" may generally refer to media such as a removable storage drive 712, a hard disk installed in a hard disk drive 710, etc. These computer program products may provide software to computer processing unit 152. Computer programs (also referred to as computer control logic) may also be stored in the main memory 704, secondary memory 708 and/or data storage devices 154, 156. Computer programs may also be received via the communications interface 720. Such computer programs, when executed by a processor, specifically enable the computer processing unit 152 to perform features of the methods discussed herein. In an embodiment implemented using software, the software may be stored in a computer program product and loaded into computer processing unit 152 using a removable storage drive 712, hard drive 710, or communications interface 720. The software, when executed by a processor 702, causes the processor 702 to specifically perform the functions described herein.

The present disclosure may be implemented by a general purpose computer or server programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

Embodiments of the subject matter and the functional operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer program products, i.e., one or more modules of computer program instructions encoded on a tangible program carrier for execution by, or to control the operation of, data processing apparatus. The tangible program carrier may be a computer readable medium. As discussed above, the computer readable medium may be a machine-readable storage device, a machine-readable storage substrate, a memory device, or a combination of one or more of them.

The term "processor" encompasses all apparatus, devices, and machines for processing data, including by way of example a programmable processor, a computer, server, or multiple processors, computers or servers. These apparatus, devices and machines may include (in addition to hardware) code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, or declarative or procedural languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by and/or implemented as special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. While the essential elements of a computer are a processor for performing instructions and one or more data memory devices for storing instructions and data, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio or video player, a game console, to name just a few.

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter described in this specification may be implemented on a computer having a display device, e.g., a cathode ray tube (CRT) or liquid crystal display (LCD) monitor, for displaying information to the user and a keyboard and a pointing device, e.g., a mouse or a trackball, by which the user may provide input to the computer. Other kinds of devices may be used to provide for interaction with a user as well; for example, input from the user may be received in any form, including acoustic, speech, or tactile input.

As discussed above, embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described is this specification, or any combination of one or more such back end, middleware, or front end components. The components of the system may be interconnected by any form or medium of digital data communication, e.g., a communication network. Examples of communication networks include a local area network (LAN) and a wide area network (WAN), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the claimed subject matter, but rather as descriptions of features that may be specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

As shown by the various configurations and embodiments illustrated in FIGS. 1-7, a system and method for providing controlled application programming interface security have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What I claim is:

1. A method comprising:
   receiving, at an application programming interface (API), a request from a first application on a user device to access data via a remote server;
   creating, with the API, a customer data key for use by the first application;
   creating, with the API, a first application key for the first application and a second application key for a second application;
   transmitting, by the API, the customer data key and the first application key to the first application via a first API call;
   transmitting, by the API, the second application key to the second application via a second API call;
   receiving, at the API, the customer data key from the first application;
   determining, by the API, that the customer data key includes the first application key;
   receiving, at the API, a user credential authorization from the second application;
   determining, by the API, that the user credential authorization from the second application includes the second application key;
   validating, with the API, the first application key and the second application key; and
   activating, with the API, the customer data key to enable the first application to access at least a portion of the data.

2. The method of claim 1, further comprising:
   determining whether the customer data key is valid for the first application, a user, and the user device; and
   when the customer data key is valid:
     activating, with the API, the customer data key to enable the first application to access a first portion of the data;
   or
   when the customer data key is invalid:

activating, with the API, the customer data key to enable the first application to access a second portion of the data;
wherein the first portion is larger than the second portion.

3. The method of claim 1, wherein the user credential authorization includes a first user credential, the method further comprising:
validating the user credential authorization by:
comparing the first user credential to a second user credential stored on the remote server; and
determining that the first user credential matches the second user credential.

4. The method of claim 1, wherein the user credential authorization includes a first user credential, the method further comprising:
validating the user credential authorization by:
transmitting the first user credential to the second application; and
receiving a notification from the second application that the first user credential has been validated against a second user credential received from the user.

5. The method of claim 4, wherein the first user credential comprises a personal identification number (PIN) or a password.

6. The method of claim 1, further comprising:
receiving, at the API, a request from the first application to access a service on the remote server;
receiving, at the API, the first application key;
determining, with the API, that the first application key is still valid; and
providing, via the API, the first application with access to the service.

7. A non-transient machine-readable storage medium encoded with program code, wherein the program code is configured such that, when executed by a processor of a device, the processor performs a method of providing access to data comprising:
receiving, at an application programming interface (API), a request from a first application on a user device to access data via a remote server;
creating, with the API, a customer data key for use by the first application;
creating, with the API, a first application key for the first application and a second application key for a second application;
transmitting, by the API, the customer data key and the first application key to the first application via a first API call;
transmitting, by the API, the second application key to the second application via a second API call;
receiving, at the API, the customer data key from the first application;
determining, by the API, that the customer data key includes the first application key;
receiving, at the API, a user credential authorization from the second application;
determining, by the API, that the user credential authorization from the second application includes the second application key;
validating, with the API, the first application key and the second application key; and
activating, with the API, the customer data key to enable the first application to access at least a portion of the data.

8. The medium of claim 7, wherein activating the customer data key comprises: validating a user credential via the second application; outputting an alert that the first application is requesting authorization to access the data; and activating, by the server, the customer data key in response to receiving an authorization to enable access to at least a portion of the data via the API.

9. The medium of claim 8, wherein validating the user credential comprises: receiving, at the server, a first user credential from the second application; authenticating the first user credential against a second user credential stored on the server; and determining that the first user credential matches the second user credential.

10. The medium of claim 8, wherein validating the user credential comprises: transmitting a first user credential to the second application; and receiving a notification from the second application that the first user credential has been validated against a second user credential received from the user.

11. The medium of claim 10, wherein the user credential comprises a personal identification number (PIN) or a password.

12. The medium of claim 7, further comprising: receiving, at the server, a request to cancel the customer data key from a third party; canceling the customer data key; and notifying the first application that the customer data key has been canceled.

13. The medium of claim 7, wherein the API is configured to limit access to the data in accordance with a user control.

14. The medium of claim 13, wherein the user control limits access to the data, to one or more applications.

15. A system comprising:
a communications interface;
one or more processors implemented in hardware; and
memory, including an application programming interface (API), and instructions that, when executed, cause the one or more processors to:
receive, at the API, a request from a first application on a user device to access data via a remote server;
create, with the API, a customer data key for use by the first application;
create, with the API, a first application key for the first application and a second application key for a second application;
transmit, by the API, the customer data key and the first application key to the first application via a first API call;
transmit, by the API, the second application key to the second application via a second API call;
receive, at the API, the customer data key from the first application;
determine, by the API, that the customer data key includes the first application key;
receive, at the API, a user credential authorization from the second application;
determine, by the API, that the user credential authorization from the second application includes the second application key;
validate, with the API, the first application key and the second application key; and
activate, with the API, the customer data key to enable the first application to access at least a portion of the data.

16. The system of claim 15, wherein the user credential authorization includes a first user credential and the instructions further cause the one or more processors to:
validate the user credential authorization by:
comparing the first user credential to a second user credential stored on the remote server; and determining that the first user credential matches the second user credential.

17. The system of claim 15, wherein the user credential authorization includes a first user credential and the instructions further cause the one or more processors to:
   validate the user credential authorization by:
      transmitting the first user credential to the second application; and
      receiving a notification from the second application that the first user credential has been validated against a second user credential received from the user.

18. The system of claim 17, wherein the first user credential and the second user credential comprise a personal identification number (PIN) or a password.

19. The system of claim 15, wherein the instructions further cause the one or more processors to:
   determine whether the customer data key is valid for the first application, a user, and the user device; and
   when the customer data key is valid:
      activating, with the API, the customer data key to enable the first application to access a first portion of the data;
   or
   when the customer data key is invalid:
      activating, with the API, the customer data key to enable the first application to access a second portion of the data;
   wherein the first portion is larger than the second portion.

20. The system of claim 15, wherein the instructions further cause the one or more processors to:
   receive, at the API, a request from the first application to access a service on the remote server;
   receive, at the API, the first application key;
   determine, with the API, that the first application key is still valid; and
   provide, via the API, the first application with access to the service.

* * * * *